Nov. 7, 1939.   J. W. DAWSON   2,179,282
ELECTRONIC SPOT WELDING CONTROL
Filed May 7, 1938
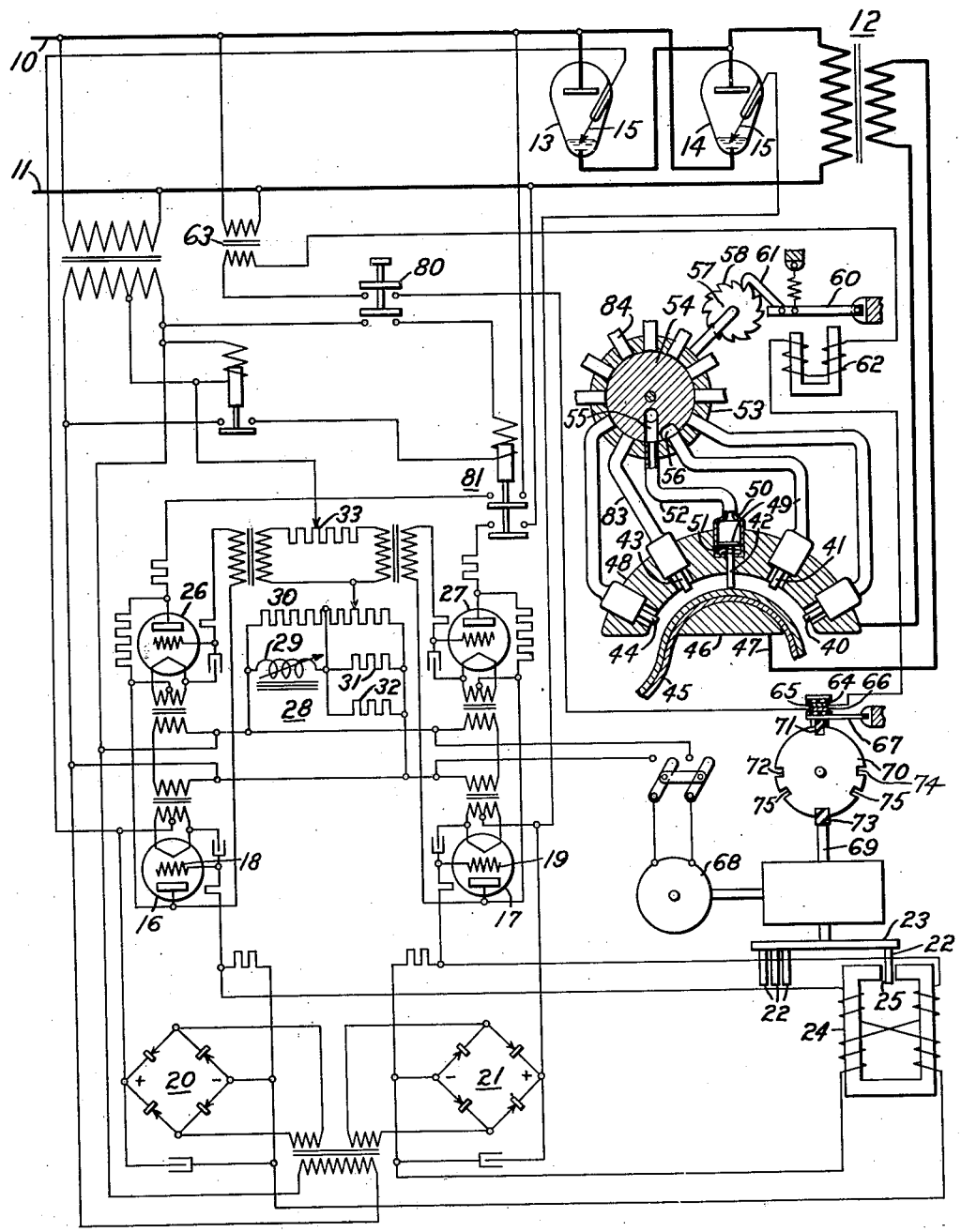
WITNESSES:
INVENTOR
John W. Dawson.
BY
ATTORNEY Patented Nov. 7, 1939

2,179,282

UNITED STATES PATENT OFFICE 2,179,282

ELECTRONIC SPOT WELDING CONTROL

John W. Dawson, Auburndale, Mass., assignor to Westinghouse Electric & Manufacturing Company, East Pittsburgh, Pa., a corporation of Pennsylvania Application May 7, 1938, Serial No. 206,639

5 Claims. (Cl. 219—4)

My invention relates to electronic welding control, and especially to the control of a welding system having a multiplicity of electrodes.

An object of the invention is to provide automatic means applying multiple electrodes in a predetermined sequence.

Another object of the invention is to control the approach of the electrodes to the welding load by means of the timing circuit for the welding current.

A further object of my invention is to provide a welding system incorporating electronic valves for timing or measuring out the successive welding current pulses in synchronism with the power supply and including a multiple welding electrode arrangement, in which the successive engagement of the electrodes with the work shall be synchronized with the welding current pulses.

More specifically stated, it is an object of the invention to provide pressure means for applying multiple electrodes to the welding load. The pressure means is adapted to apply the electrodes to the welding load and to withdraw them therefrom. Electrical means are provided according to the invention whereby after the welding current has passed through one electrode, the electrode is automatically withdrawn and the next electrode in sequence applied to the welding load in the following non-conducting period.

Other objects and advantages of the invention will be apparent from the following description and drawing in which the single figure is a diagrammatic circuit illustrating the preferred embodiment of the invention.

Lines 10 and 11 are current lines from any suitable alternating-current supply system and are applied to the welding system through a suitable welding transformer 12. In order that both waves of the welding current may be controlled, I preferably apply two electrical valves 13 and 14. These valves are inversely connected to one another and while they may be of other types, I prefer to have them of the mercury pool cathode type having a make-alive preferably of a high resistance carborundum or boron carbide 15 immersed in the mercury for the ignition of the discharge.

In order to provide a timing means for each of the electric valves 13 and 14, I utilize a timing circuit including two electrical discharge devices 16 and 17. These electrical devices have their grids 18 and 19 normally biased by the negative potential from rectifier bridges 20 and 21, energized from the alternating-current lines 10 and 11. The blocking potential on the grids 18 and 19 is removed by a voltage surge caused by pins 22 on a revolving disc 23 passing through the gap in a magnet 24. The number of half-cycles during which the tubes 16, 17 will conduct will be dependent upon the number of associated pins and the speed of the disc 23. When the gap 25 is free of pins the negative bias from 20 and 21 will again stop the discharge through the tubes 16 and 17 and likewise, the passage of welding current through the electric valves 13 and 14. The particular portion of the invention is more particularly described in my Patent No. 2,081,987, issued June 1, 1937, on an Electrical control system.

I also preferably supply two other discharge devices 26 and 27 to control the shape of the wave through the welding circuit and by this means also control the amount of heat generated in the welding circuit by the wave of current therethrough. I do this by applying to these tubes a phase shift circuit 28 including the adjustable reactor 29 and resistances 30, 31 and 32. This particular heat control scheme is more particularly described in my Patent No. 2,083,190 issued June 8, 1937, for Welding apparatus. I also provide a balancing potentiometer 33 to adjust for individual differences between the electric valves 13 and 14 and also for individual differences between the circuits associated with each valve.

The particular welding circuit disclosed involves a multiple electrode system having multiple electrodes 40, 41, 42, 43 and 44 adapted to be applied in sequence to a welding load. This welding load may be of the type such as an automobile fender 45, to be welded to a portion of the automobile body 46. The common welding electrode 47 for these multiple electrodes is, of course, attached to the automobile body 46. The multiple electrodes 40 through 44 are preferably secured in a body 48 that is shaped to be placed over the welding load and to align the multiple electrodes in desired position to be applied in predetermined sequence to the welding load. The welding electrodes are attached to a piston head 49 in a cylinder 50. A spring 51 normally acts to withdraw the electrode from the welding load.

Each of the multiple electrode cylinders 50 has a conduit 52 extending to a ring 53 within which is preferably a revolvable cylinder 54. This cylinder 54 has two ports 55 and 56 arranged to communicate with two adjacent ports of the conduits 52. The ports 55 and 56 are preferably connected with any pressure means, such as a compressor whereby highly compressed gas or air or other medium, such as a liquid, is supplied to the conduit 55 under pressure. The cylinder 54 may be revolved in any suitable way such as by the ratchet 57 having teeth 58 suitable for each step of putting the pressure port 55 from one conduit 52 to the next conduit. If desired the parts 53, 54 may be slidable one on the other instead of rotatable as disclosed or any other equivalent mechanical arrangement substituted.

In order to control the automatic application of the electrodes to the welding load, I provide an arm 60 of magnetizable material having a lever arm 61 connected to the ratchet teeth 58. An electromagnet 62 actuates the arm and lever 60, 61 and this electromagnet is connected to a source of current such as the supply lines 10 and 11 through a suitable transformer 63.

While many ways of connecting this electromagnet 62 to the timing circuit may be made, I prefer to utilize a switch 64 which comprises a fixed contact 65, and another movable contact 66 on a flexible arm 67. The synchronous motor 68 revolves the timing disc 23, and the timing circuit is also preferably geared to a shaft 69 and has a gear connection such as a worm gear, that revolves a disc 70 with its periphery close to the flexible arm 67. Inserted in the periphery of the disc 70 is a brush 71 adapted to press the flexible arm 67 and its contact 66 in contact with 65 and complete the connection to the electromagnet 62. When the brush 71 passes by the flexible arm 67 the arm drops away from the contact 65 through gravity or any other suitable positive means and breaks the contact to the electromagnet 62.

The brushes 71 may be placed in as many notches 72 in the disc 70 as desired. As illustrated, the brushes 71 and 73 are placed in notches 180° apart so that the electromagnet 62 is operated twice for each revolution of the disc 70. Other notches are disclosed, such as that indicated at 74, whereby the notches may be made 90° apart, or that at 75, which may be made at 120° from each other and the brush 71. It is apparent that any number of spaced brushes may be inserted in the periphery of the disc 70 to make a specified number of contacts with the electromagnetic circuit 62.

Also illustrated in the drawing are the foot switch 80 and relay operated switch 81 and various transformers and other elements whose operation will be apparent to any one skilled in the art.

In operation of the device, the switch 80 is closed and the circuit energized. As illustrated, the pressure through the conduits 55 and 52 has applied the welding electrode 42 to the welding load comprising the portions 45 and 46. The pins 22 entering the gap 25 will permit the tubes 16 and 17 to discharge and pass current to the make-alives 15 for a portion of the wave cycle under control of the tubes 26 and 27, and this will permit the welding current from the supply lines 10 and 11 to pass through the electrode 42 to provide a weld at its contact point. While the weld at 42 is being made the disc 70 has revolved and the contact 64 is being broken during the weld. When the welding period stops, the brush 73 will make contact with the switch 64 and this will actuate the electromagnet 62 and this, in turn, will revolve the cylinder 54 to bring the suction port 56 to the conduit 52 to withdraw the pressure from the cylinder 50 and permit the spring 51 to withdraw electrode 42 from the work.

The pressure conduit 55 will, at the same time, be applied to the next conduit 83 and the welding electrode 43 will be applied to the welding load and be set for the next impulse of welding current therethrough. The invention, accordingly, provides for the automatic application of the multiple electrodes in sequence to the work.

Various modifications can, of course, be made in the preferred embodiment illustrated. Various other timing means may be utilized. Also the ports 55 and 56 in connection with the pressure means, may be enlarged to take 2 or more electrodes at one time. The additional ports 84 illustrated may be also connected to actuate electrodes to be applied to the welding load illustrated or may be connected to electrodes connected to other welding loads that will be operated while the welding load illustrated is being connected or disconnected. In view of the many modifications possible with the preferred embodiment disclosed, I desire only such limitations be imposed upon the following claims as are necessitated by the prior art.

I claim as my invention:

1. A system for a welding load comprising a plurality of electrodes adapted to be applied to said load, mechanical means for selectively applying said electrodes to said load, connections to a source of electrical energy, timing means applying said electrical energy to said welding load, means for operating said timing means, and electrical means actuated by said operating means and operating said mechanical means.

2. A system for a welding load comprising a plurality of electrodes adapted to be applied to said load, pressure means for selectively applying said electrodes to said load, connections to a source of electrical energy, timing means applying said electrical energy to said welding load, means for operating said timing means, and electrical means actuated by said operating means and operating said pressure means.

3. A system for a welding load comprising a plurality of electrodes adapted to be applied to said load, pressure means, movable means adapted to apply said pressure means to said electrodes in predetermined sequence, connections to a source of electrical energy, timing means applying said electrical energy to said welding load, means for operating said timing means, and electrical means actuated by said operating means to move said movable means.

4. For use in supplying a welding load from a periodic source, the combination comprising electronic valve means interposed between said source and said load, means for rendering said valve means conducting so that it conducts successive current impulses to said load in synchronism with said source, a plurality of sets of welding electrodes, selective means for applying each of said sets of electrodes to said load in succession, means for controlling said rendering means, and means actuated by said controlling means for operating said selective means to apply said sets of electrodes in synchronism with said current impulses.

5. Apparatus according to claim 4 characterized by the fact that the means for rendering the valve means conducting includes a program disc rotated by a synchronous motor and the means for operating the selective means is actuated by said motor.

JOHN W. DAWSON.